United States Patent
Shimizu et al.

(10) Patent No.: US 11,904,869 B2
(45) Date of Patent: Feb. 20, 2024

(54) MONITORING SYSTEM AND NON-TRANSITORY STORAGE MEDIUM

(71) Applicant: Nuvoton Technology Corporation Japan, Kyoto (JP)

(72) Inventors: Yasuyuki Shimizu, Kyoto (JP); Seiji Matsui, Osaka (JP); Naoya Tomoda, Kyoto (JP); Fumihito Nakajima, Osaka (JP); Tomohiko Kanemitsu, Osaka (JP); Takuya Asano, Hyogo (JP); Norihiro Imanaka, Kyoto (JP); Seigo Suguta, Nara (JP); Masanori Hirofuji, Osaka (JP)

(73) Assignee: Nuvoton Technology Corporation Japan, Kyoto (JP)

( * ) Notice: Subject to any disclaimer, the term of this patent is extended or adjusted under 35 U.S.C. 154(b) by 0 days.

(21) Appl. No.: 17/718,999

(22) Filed: Apr. 12, 2022

(65) Prior Publication Data

US 2022/0234594 A1 Jul. 28, 2022

Related U.S. Application Data

(63) Continuation of application No. PCT/JP2020/039156, filed on Oct. 16, 2020.

(30) Foreign Application Priority Data

Oct. 17, 2019 (JP) ................................. 2019-190439

(51) Int. Cl.
   *B60W 40/09* (2012.01)
   *B60W 50/14* (2020.01)
   *B60W 40/08* (2012.01)

(52) U.S. Cl.
   CPC ............ *B60W 40/09* (2013.01); *B60W 50/14* (2013.01); *B60W 2040/0827* (2013.01);
   (Continued)

(58) Field of Classification Search
   CPC ................ B60W 40/09; B60W 50/14; B60W 2040/0827; B60W 2040/0872; B60W 2050/143; B60W 2050/146
   See application file for complete search history.

(56) References Cited

U.S. PATENT DOCUMENTS

| 2010/0090839 | A1  | 4/2010  | Omi |
| 2017/0364761 | A1* | 12/2017 | Ryu .................... B60K 35/00 |
| 2020/0285231 | A1* | 9/2020  | Herman ............ A61B 5/6898 |

FOREIGN PATENT DOCUMENTS

| GB | 2312309 A   | * 10/1997 | ......... A61B 5/02438 |
| JP | 2002-074599 A | 3/2002 | |

(Continued)

OTHER PUBLICATIONS

English translation of JP2019-190439 (Year: 2019).*

(Continued)

*Primary Examiner* — Nabil H Syed
*Assistant Examiner* — Cal J Eustaquio
(74) *Attorney, Agent, or Firm* — Rimon, P.C.

(57) ABSTRACT

A monitoring system includes an arithmetic processor. The arithmetic processor receives captured image information representing a captured image obtained by capturing an image of a subject and generates notification information representing a particular notification content depending on a condition of the subject. The arithmetic processor includes a first arithmetic processor and a second arithmetic processor. The first arithmetic processor obtains a condition quantity by quantifying the condition of the subject by reference to the captured image information and based on a parameter about a human activity status. The second arithmetic processor selects, according to the condition quantity, the particular notification content from contents of notification classified into N stages, where N is an integer equal to or greater than three.

20 Claims, 13 Drawing Sheets

(52) U.S. Cl.
    CPC ............... *B60W 2040/0872* (2013.01); *B60W 2050/143* (2013.01); *B60W 2050/146* (2013.01)

(56) References Cited

FOREIGN PATENT DOCUMENTS

| | | |
|---|---|---|
| JP | 2008-186263 A | 8/2008 |
| JP | 2008-210375 A | 9/2008 |
| JP | 2009-125518 A | 6/2009 |
| JP | 2010-029537 A | 2/2010 |
| JP | 2017-033047 A | 2/2017 |
| JP | 2018-181080 A | 11/2018 |

OTHER PUBLICATIONS

International Search Report dated Dec. 8, 2020 issued in International Patent Application No. PCT/JP2020/039156, with English translation.
Description of the Japanese Priority Patent Application No. 2019-190439.

* cited by examiner

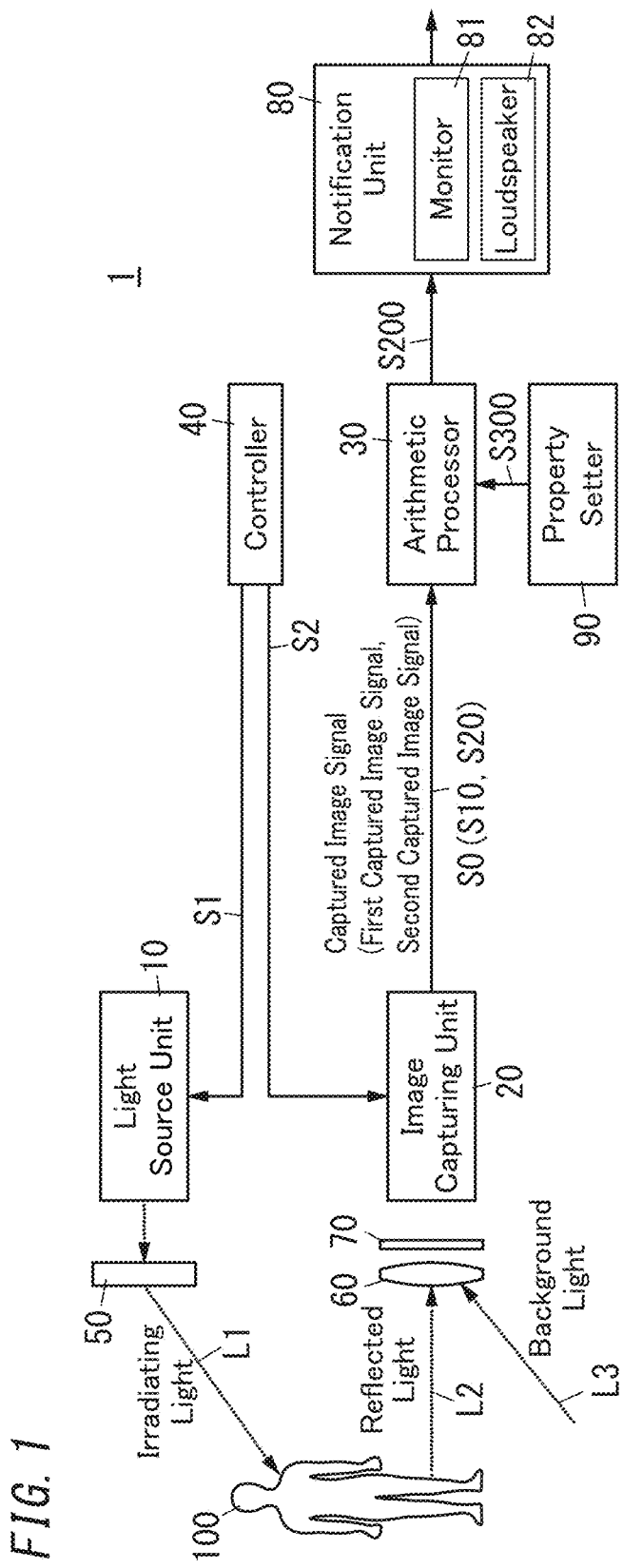

MONITORING SYSTEM AND NON-TRANSITORY STORAGE MEDIUM

CROSS-REFERENCE TO RELATED APPLICATIONS

The present application is a Bypass Continuation of International Application No. PCT/JP2020/039156, filed on Oct. 16, 2020, which is based upon, and claims the benefit of priority to, Japanese Patent Application No. 2019-190439, filed on Oct. 17, 2019. The entire contents of both applications are hereby incorporated by reference.

TECHNICAL FIELD

The present disclosure generally relates to a monitoring system and a non-transitory storage medium, and more particularly relates to a monitoring system for monitoring the condition of a subject and a non-transitory storage medium.

BACKGROUND ART

JP 2002-074599 A discloses a transportation service management system. The transportation service management system includes a driver's condition determiner, an image capturing means, and a face image input control device. The driver's condition determiner determines, based on a driver's physiological data, whether the driver's condition is normal or abnormal. The image capturing means captures a face image of the driver. The face image input control device makes, when the driver's condition determiner determines that the driver's condition should be abnormal, the image capturing means input a face image of the driver. The transportation service management system transmits, when the driver's condition is determined to be abnormal, the face image to a transportation service management center.

At the transportation service management center, a transportation service manager makes, based on the face image transmitted, a comprehensive decision about the situations and gives the driver an instruction or a command.

This transportation service management system just determines whether the driver's condition is normal or abnormal. Thus, if the driver's condition is abnormal, then the transportation service manager, who is a human, needs to decide, according to the degree of abnormality, what kind of countermeasure should be taken.

The present disclosure provides a monitoring system and a non-transitory storage medium, which are configured or designed to make an appropriate notification according to a condition of the subject.

SUMMARY OF INVENTION

A monitoring system according to an aspect of the present disclosure includes an arithmetic processor. The arithmetic processor receives captured image information, representing a captured image obtained by capturing an image of a subject, and generates notification information representing a particular notification content depending on a condition of the subject. The arithmetic processor includes a first arithmetic processor and a second arithmetic processor. The first arithmetic processor obtains a condition quantity by quantifying the condition of the subject by reference to the captured image information and based on a parameter about a human activity status. The second arithmetic processor selects, according to the condition quantity, the particular notification content from contents of notification classified into N stages, where N is an integer equal to or greater than three.

A non-transitory storage medium according to another aspect of the present disclosure stores thereon a program designed to cause one or more processors, which receive captured image information representing a captured image obtained by capturing an image of a subject, to perform first arithmetic processing and second arithmetic processing. The first arithmetic processing includes obtaining a condition quantity by quantifying a condition of the subject by reference to the captured image information and based on a parameter about a human activity status. The second arithmetic processing includes selecting, according to the condition quantity, a particular notification content from contents of notification classified into N stages, where N is an integer equal to or greater than three.

BRIEF DESCRIPTION OF DRAWINGS

The figures depict one or more implementations in accordance with the present teaching, by way of example only, not by way of limitations. In the figures, like reference numerals refer to the same or similar elements.

FIG. 1 is a schematic block diagram illustrating a configuration for a monitoring system according to an exemplary embodiment;

FIGS. 2A-2D are schematic representations illustrating configurations for pixel arrays of a solid-state image sensor of an image capturing unit included in the monitoring system;

DETAILED DESCRIPTION

Figure 3:
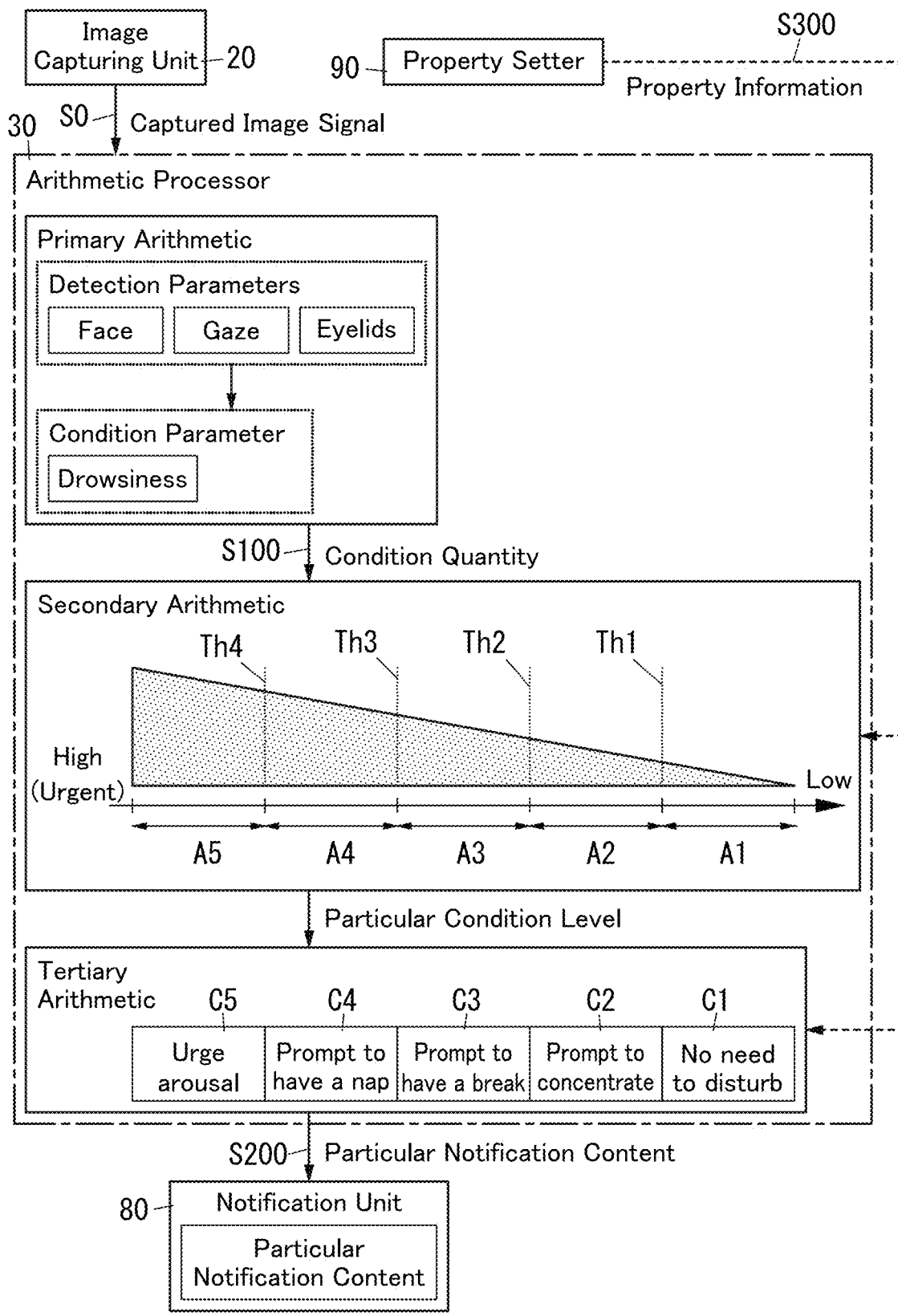
FIG. 3 is a schematic block diagram illustrating a configuration for a main part of a first exemplary application of the monitoring system.

An exemplary embodiment of the present disclosure will now be described in detail with reference to the accompanying drawings. Note that each of the exemplary embodiments to be described below provides a specific example of the present disclosure. The numerical values, shapes, materials, constituent elements, relative positions between the constituent elements, their connection, timings to drive the constituent elements, and other specifics to be presented in the following description are all examples and should not be construed as limiting the scope of the present disclosure. In addition, constituent elements described in the following description of embodiments which are not recited in an independent claim indicating the broadest scope of the present disclosure should be regarded as optional constituent elements. Furthermore, the drawings attached herewith are not necessarily exactly to scale. Also, as for any constituent element illustrated on multiple drawings and having substantially the same configuration, their description will be either omitted or simplified, once described, to avoid redundancies.

(1) Embodiment (1-1) Configuration

FIG. 1 is a block diagram illustrating a configuration for a monitoring system 1 according to an exemplary embodiment.

As shown in FIG. 1, the monitoring system 1 includes a light source unit 10, an image capturing unit 20, an arithmetic processor 30, a controller 40, a diffuser panel 50, a lens 60, a band-pass filter 70, a notification unit 80, and a property setter 90.

The light source unit 10 emits, at a timing indicated by an emission control signal S1 generated by the controller 40, light (irradiating light L1) to irradiate a subject 100 (see FIG. 1). The irradiating light L1 emitted from the light source unit 10 is transmitted through the diffuser panel 50 and radiated toward the subject 100.

The light source unit 10 includes, for example, a capacitor, a driver circuit, and a light-emitting element. The light source unit 10 drives the light-emitting element with the electrical energy stored in the capacitor, thereby emitting light (i.e., emitting the irradiating light L1). The light-emitting element may be implemented as, for example, a laser diode or a light-emitting diode. Note that the light source unit 10 may be configured to include only one type of light-emitting element. Alternatively, the light source unit 10 may also be configured to include multiple different types of light-emitting elements according to their respective intended uses.

In the following description, the light-emitting element is supposed to be, for example, a laser diode which emits near-infrared light or a light-emitting diode which emits near-infrared light (IR light), and the irradiating light L1 emitted from the light source unit 10 is supposed to be near-infrared light. However, the irradiating light L1 emitted from the light source unit 10 does not have to be near-infrared light. Alternatively, the irradiating light L1 emitted from the light source unit 10 may also be infrared light falling within a frequency range different from that of near-infrared light.

The image capturing unit 20 generates a captured image by capturing an image of the subject 100. The image capturing unit 20 may include, for example, a solid-state image sensor (image sensor). The image capturing unit 20 generates captured image information, representing either an exposure dose or a distance value on a pixel-by-pixel basis, by capturing an image of the subject 100. That is to say, the image capturing unit 20 generates the captured image information representing at least one of a luminance image indicating a luminance distribution on the subject 100 or a distance image indicating a distribution of distance to the subject 100. The image capturing unit 20 outputs a captured image signal S0 representing the captured image information thus generated.

More specifically, the image capturing unit 20 performs an exposure process at the timing indicated by an exposure control signal S2 generated by the controller 40 and outputs a captured image signal indicating a distance value calculated based on the exposure dose (i.e., a first captured image signal S10 providing distance information) and a captured image signal indicating an exposure dose (i.e., a second captured image signal S20 providing luminance information).

The solid-state image sensor has a pixel array in which a plurality of pixels are arranged to form an array. The solid-state image sensor includes a plurality of pixels to receive reflected light L2, which is produced by having the irradiating light L1 reflected by the subject 100. Optionally, the solid-state image sensor may also have a cover glass or a logic function such as that of an A/D converter. Note that background light L3 (such as sun light, light emitted from a light fixture, and scattering light thereof), other than the reflected light L2 of the light emitted from the light source unit 10, is also incident on the solid-state image sensor.

Figures 2A, 2B, 2C, 2D:
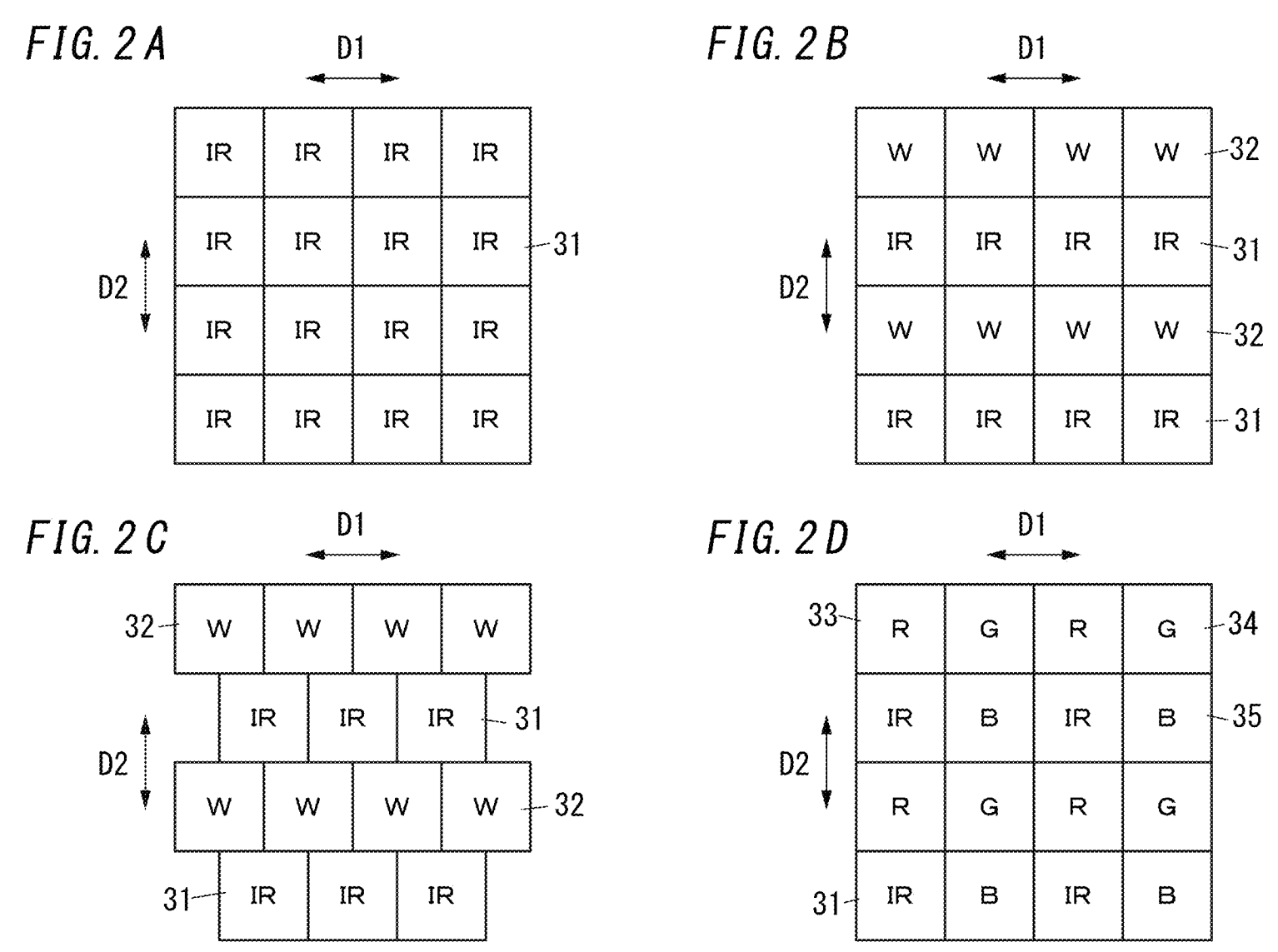

FIG. 2A illustrates a pixel array that the solid-state image sensor according to this embodiment has. The pixel array includes a plurality of first pixels 31. In the pixel array shown in FIG. 2A, the first pixels 31 are arranged to form an array (e.g., to form a matrix pattern in this example). The first pixels 31 are infrared (IR) pixels having sensitivity to the near-infrared wavelength range. That is to say, the pixel array according to this embodiment is formed by arranging, in an array pattern, the first pixels 31 (IR pixels), each of which contributes to capturing an image by using the reflected light L2 produced by having the irradiating light L1 (near-infrared light) emitted from the light source unit 10 reflected from the subject 100.

Nevertheless, the pixels (pixel array) of the solid-state image sensor do not have to have the exemplary arrangement shown in FIG. 2A.

Alternatively, the pixel array may also have a plurality of first pixels 31 and a plurality of second pixels 32 as shown in FIG. 2B. The second pixels 32 are white pixels (W pixels) having sensitivity to the visible light wavelength range. In the pixel array shown in FIG. 2B, rows of first pixels 31 arranged side by side in a first direction D1 (i.e., laterally in FIG. 2B) and rows of second pixels 32 arranged side by side in the first direction D1 (i.e., laterally in FIG. 2B) alternate in a second direction D2 (i.e., vertically in FIG. 2B). That is to say, the pixel array shown in FIG. 2B is formed by arranging the first pixels 31 (IR pixels), each of which contributes to capturing an image by using the reflected light L2 produced by having the irradiating light L1 reflected by the subject 100, and the second pixels 32 (W pixels, white pixels), each of which contributes to capturing an image of the subject 100 by receiving visible light, alternately on a row-by-row basis in an array pattern (i.e., in a matrix pattern). In this case, each of the second pixels 32 (W pixels) outputs, as a captured image signal, a luminance signal (light and dark tone signal) to provide luminance information (light and dark tone information) based on the visible light.

In the pixel array shown in FIG. 2B, the first pixels 31 and the second pixels 32 are arranged (alternately) to be adjacent to each other in the second direction D2 and to form stripes that are arranged one top of another in the second direction D2. However, this is only an example and should not be construed as limiting. Alternatively, for example, rows of the first pixels 31 and rows of the second pixels 32 may also be arranged every multiple rows (e.g., every three rows). That is to say, first rows, on each of which the first pixels 31 are arranged side by side to be adjacent to each other in the first direction D1, and second rows, on each of which the second pixels 32 are arranged side by side to be adjacent to each other in the first direction D1, may be arranged alternately every L rows (where L is a natural number). Alternatively, first rows, on each of which the first pixels 31 are arranged side by side to be adjacent to each other in the first direction D1, may be arranged every O rows, and second rows, on each of which the second pixels 32 are arranged side by side to be adjacent to each other in the first direction D1, may be arranged every P rows (where O and P are mutually different natural numbers).

Still alternatively, in another pixel array of the solid-state image sensor, multiple rows of the first pixels 31 and multiple rows of the second pixels 32, which are arranged alternately in the second direction D2 on a photosensitive plane, may also be arranged to shift from each other in the first direction D1 as shown in FIG. 2C.

Optionally, as shown in FIG. 2D, the pixel array may also include three types of pixels in the three primary colors of red (R), green (G), and blue (B) (hereinafter referred to as a "third pixel 33," a "fourth pixel 34," and a "fifth pixel 35," respectively) to form a color image. The third pixel 33 is an R pixel having sensitivity to the wavelength range of a red ray. The fourth pixel 34 is a G pixel having sensitivity to the wavelength range of a green ray. The fifth pixel 35 is a B pixel having sensitivity to the wavelength range of a blue ray. In the example illustrated in FIG. 2D, rows, on each of which the third pixels 33 and the fourth pixels 34 are alternately arranged in the first direction D1, and rows, on each of which the second pixels 32 and the fifth pixels 35 are alternately arranged in the first direction D1, alternate in the second direction D2.

Furthermore, the solid-state image sensor does not have to have such a configuration in which the plurality of first pixels 31 and the plurality of second pixels 32 are arranged two-dimensionally. Alternatively, the solid-state image sensor may also have a configuration in which the first pixels 31 and the second pixels 32 are arranged in line (e.g., alternately) as in a line sensor.

As shown in FIG. 1, the lens 60 and the band-pass filter 70 are arranged in front of the photosensitive plane of the image capturing unit 20. The light transmitted through the lens 60 and the band-pass filter 70 is incident on the photosensitive plane of the image capturing unit 20. The lens 60 is a convex lens. The light incident on the lens 60 is condensed onto the photosensitive plane of the image capturing unit 20. The band-pass filter 70 is disposed between the lens 60 and the image capturing unit 20. The band-pass filter 70 either cuts off or attenuates all light but light falling within a desired wavelength range (such as near-infrared light).

The controller 40 controls the operation of the light source unit 10 and the image capturing unit 20. The controller 40 controls emission of light from the light source unit 10 by outputting the emission control signal S1 to the light source unit 10. The controller 40 controls the exposure of the image capturing unit 20 by outputting the exposure control signal S2 to the image capturing unit 20. The controller 40 makes the image capturing unit 20 capture a luminance image and a distance image by controlling the light source unit 10 and the image capturing unit 20. It will be described later how the controller 40 controls the operation of capturing an image.

The light source unit 10, the image capturing unit 20, and the controller 40 may be, for example, housed in a single housing to form an image capture device. The image capture device is installed at an appropriate position to allow the image capturing unit 20 to capture an image of the subject 100.

The monitoring system 1 according to this embodiment will be further described in detail with reference to FIGS. 1-13.

FIG. 3 is a detailed diagram illustrating a configuration for a main part of the monitoring system 1 according to this embodiment. In FIG. 3, the image capturing unit 20, the arithmetic processor 30, the notification unit 80, and the property setter 90 of the monitoring system 1 are illustrated among various constituent elements of the monitoring system 1.

The arithmetic processor 30 receives captured image information (i.e., a captured image signal S0), representing a captured image obtained by capturing an image of a subject 100, from the image capturing unit 20. The arithmetic processor 30 generates notification information representing a particular notification content depending on a condition of the subject 100, and outputs a notification signal S200 representing the notification information thus generated.

The arithmetic processor 30 includes a microcontroller including one or more processors and one or more memories. The microcontroller performs the functions of the arithmetic processor 30 by making the one or more processors execute a program stored in the one or more memories. The program may be stored in advance in the memory. The program may also be distributed after having been stored in a non-transitory storage medium such as a memory card or downloaded via a telecommunications line. In other words, the program is designed to cause the one or more processors to function as the arithmetic processor 30.

The arithmetic processor 30 may be implemented as, for example, a server. The arithmetic processor 30 (server) acquires the captured image information (captured image signal S0) by establishing wired or wireless communication with the image capture device (image capturing unit 20).

Figure 4:
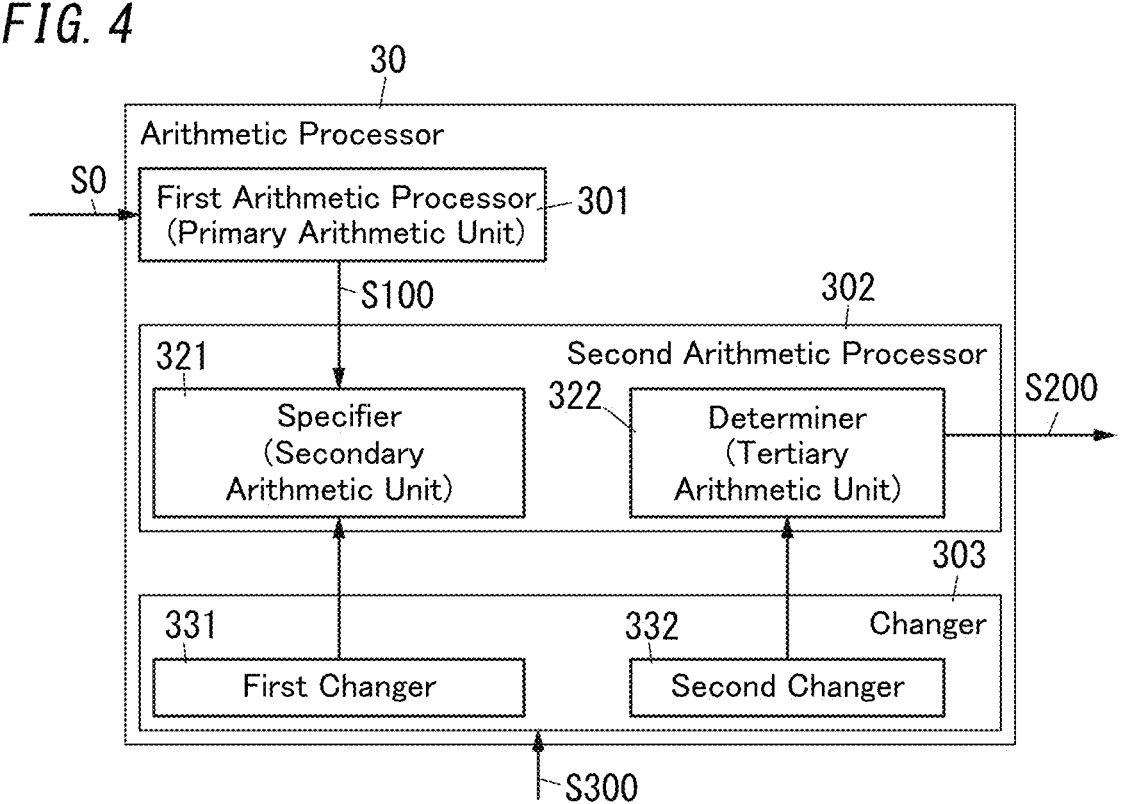
FIG. 4 is a schematic block diagram illustrating a configuration for an arithmetic processor of the monitoring system.

As shown in FIG. 4, the arithmetic processor 30 includes a first arithmetic processor 301 and a second arithmetic processor 302.

The first arithmetic processor (primary arithmetic unit) 301 obtains a condition quantity by quantifying a condition of the subject 100 (i.e., performs primary arithmetic) by reference to the captured image information (captured image signal S0) and based on a parameter (hereinafter referred to as a "detection parameter" for convenience sake) about a human activity status.

The detection parameter is a variable (parameter) about a human activity status, which may be acquired (determined) from the captured image information (captured image) and which is used to detect the condition of the subject 100. Specific examples of the detection parameters include posture, location, motion velocity, and conditions of respective parts (such as face, hands, legs, and eyes).

The first arithmetic processor 301 recognizes the subject 100 and respective parts thereof in the captured image by image processing such as edge extraction or pattern recognition. In addition, the first arithmetic processor 301 also recognizes the motion of the subject 100 and respective parts thereof by image processing such as inter-frame differential method. The first arithmetic processor 301 obtains the values of the respective detection parameters based on the locations, motions, and other parameters of the subject 100 and respective parts thereof thus recognized.

In addition, the first arithmetic processor 301 also obtains the condition quantity based on the values of the respective detection parameters thus obtained. For example, the first arithmetic processor 301 may obtain the condition quantity by reference to correspondence data (such as a relational expression) stored in advance to indicate the relationship between the values of the detection parameters and the condition quantity. The first arithmetic processor 301 passes a condition quantity signal S100, representing the condition quantity thus obtained, to the second arithmetic processor 302.

As used herein, the "condition quantity" may be a quantity about the degree of criticalness of the condition of the subject 100. The degree of criticalness of the condition of the subject 100 herein refers to the degree indicating how critical the current condition of the subject 100 is. That is to say, the arithmetic processor 30 performs arithmetic processing to estimate the degree of criticalness of the condition of the subject 100. The condition quantity may be, for example, a quantity about the drowsiness of the subject 100 (a numerical value indicating the degree of his or her drowsiness).

The second arithmetic processor 302 selects, according to the condition quantity obtained by the first arithmetic processor 301, a particular notification content from contents of notification classified into N stages, where N is an integer equal to or greater than three. The contents of notification in the N stages are stored in advance in the memory of a microcontroller serving as the arithmetic processor 30. That is to say, the contents of notification in the N stages are set in advance in the arithmetic processor 30.

As shown in FIG. 4, the second arithmetic processor 302 includes a specifier 321 and a determiner 322.

The specifier 321 (secondary arithmetic unit) specifies, based on a result of comparison between the condition quantity obtained by the first arithmetic processor 301 and a threshold value, a particular condition level out of condition levels that are sorted into M stages, where M is a natural number equal to or greater than N (i.e., performs secondary arithmetic).

The condition levels in the M stages are levels indicating respective stepwise transitions of conditions of the subject 100 ranging from a normal condition through a critical condition.

In this example, the condition levels in the M stages are sorted in advance according to (M−1) threshold values. The specifier 321 compares the condition quantity (e.g., a numerical value indicating the degree of drowsiness) obtained by the first arithmetic processor 301 with the (M−1) threshold values, thereby determining which of the condition levels in the M stages the condition of subject 100 corresponds to. The specifier 321 specifies the condition level that is determined to correspond to the condition of the subject 100 as the particular condition level.

In the example illustrated in FIG. 3, condition levels in five stages (namely, a first level A1 through a fifth level A5) are set by four threshold values (namely, a first threshold value Th1 through a fourth threshold value Th4, where Th1<Th2<Th3<Th4). Specifically, if the value of the condition quantity is less than the first threshold value Th1, then the first level A1 is specified as the particular condition level. If the value of the condition quantity is equal to or greater than the first threshold value Th1 but less than the second threshold value Th2, then the second level A2 is specified as the particular condition level. If the value of the condition quantity is equal to or greater than the second threshold value Th2 but less than the third threshold value Th3, then the third level A3 is specified as the particular condition level. If the value of the condition quantity is equal to or greater than the third threshold value Th3 but less than the fourth threshold value Th4, then the fourth level A4 is specified as the particular condition level. If the value of the condition quantity is equal to or greater than the fourth threshold value Th4, then the fifth level A5 is specified as the particular condition level.

The determiner 322 (tertiary arithmetic unit) determines, based on the particular condition level specified, a content of notification associated with the particular condition level out of the contents of notification in the N stages (where N is an integer equal to or less than M), to be the particular notification content (i.e., performs tertiary arithmetic).

In this example, the condition levels in the M stages are associated in advance with the contents of notification in the N stages. In this embodiment, each condition level is associated with a single content of notification. If N=M, for example, the condition levels in the M stages are associated one to one with the contents of notification in the N stages. On the other hand, if N<M, then at least one content of notification is associated with two or more condition levels.

In the example illustrated in FIG. 3, the contents of notification in five stages (namely, a first content of notification C1 through a fifth content of notification C5) are associated one to one with the condition levels in five stages (namely, the first level A1 through the fifth level A5).

The categories of the contents of notification in the N stages correspond to respective levels in multiple stages defined by making a stepwise classification of the conditions of the subject 100 ranging from a normal condition through a critical condition.

The arithmetic processor 30 outputs notification information (notification signal S200), representing the particular notification content selected by the second arithmetic processor 302 (i.e., determined by the determiner 322), to the notification unit 80.

The notification unit 80 notifies, in accordance with the notification information (notification signal S200) representing the particular notification content, a notifyee of the particular notification content. The notification unit 80 may be, for example, a mobile communications device (such as a smartphone or a tablet computer) owned by the notifyee. The mobile communications device performs the functions of the notification unit 80 by executing an appropriate application program. The notification unit 80 acquires the notification information (notification signal S200) by establishing wired or wireless communication with the arithmetic processor 30.

The notification unit 80 includes at least one of a monitor 81 to provide the notification (particular notification content) as visual information or a loudspeaker 82 to provide the notification as audio information. The notification made by the notification unit 80 may include at least one of display of information (on a screen, for example) or transmission of information (such as transmission of a voice or a sound or transmission of a signal to another device).

In short, a monitoring system 1 according to this embodiment is designed to monitor a subject 100. The monitoring system 1 includes an image capturing unit 20, an arithmetic processor 30 which receives a captured image signal S0 (see FIG. 1) from the image capturing unit 20, and a notification unit 80 which receives notification information about a particular notification level (particular notification content: notification signal S200). The arithmetic processor 30 performs primary arithmetic including calculating, based on a condition parameter, condition information (condition quantity) of the subject 100 by reference to the detection information of the subject 100 based on a detection parameter. The arithmetic processor 30 also performs secondary arithmetic including specifying, by reference to the condition information (condition quantity), a particular condition level out of condition levels in M stages, where M is a natural number equal to or greater than three. The arithmetic processor 30 further performs tertiary arithmetic including specifying, by reference to information about the particular condition level (particular condition information), a particular notification level corresponding to the particular condition level out of contents of notification in N stages, where N is a natural number equal to or greater than three and N≤M. The notification unit 80 makes notification by reference to the information about the particular notification content (notification information).

The property setter 90 receives, as input information, at least one of information about an environment in which the subject 100 is present or information about the subject 100. The property setter 90 outputs property information, which is based on the input information, to the arithmetic processor 30.

Figure 5:
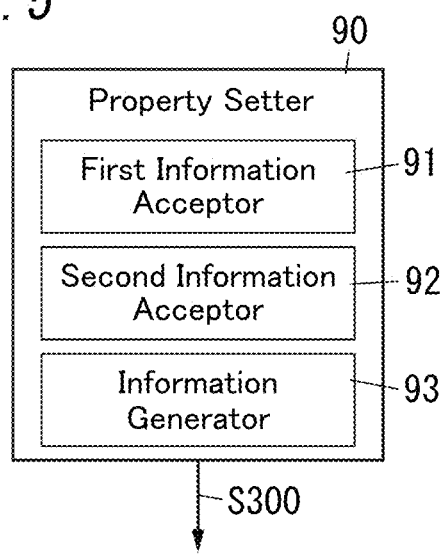
FIG. 5 is a schematic block diagram illustrating a configuration for a property setter of the monitoring system.

As shown in FIG. 5, the property setter 90 includes a first information acceptor 91, a second information acceptor 92, and an information generator 93.

The first information acceptor 91 (environmental information acceptor) receives input information about the environment in which the subject 100 is present (hereinafter referred to as "environmental information").

The environmental information may include various sorts of information about, for example, the current time, the weather, the temperature, the location coordinates of the subject 100 (such as coordinates on a positioning system or coordinates inside a building), and the type of an object present around the subject 100. The environmental information that may be received by the first information acceptor 91 defined in advance for the property setter 90.

The environmental information may be supplied from an external device to the first information acceptor 91 via, for example, wired or wireless communication. The first information acceptor 91 may include a user interface for entering the environmental information in accordance with the user's operating command.

The second information acceptor 92 (subject information acceptor) receives input information about the subject 100 (hereinafter referred to as "subject information").

The subject information may include various sorts of information about the subject 100 other than the information derived about the subject 100 from the captured image obtained by the image capturing unit 20. The subject information may be, for example, information about the attributes of the subject 100. The subject information may include various sorts of information such as the age, gender, professional career, working hours, and sleeping hours, of the subject 100. The subject information that may be received by the second information acceptor 92 defined in advance for the property setter 90.

The subject information may be supplied from an external device to the second information acceptor 92 via, for example, wired or wireless communication. The external device may be a mobile communications device owned by the subject 100 or the notifyee, for example. Entering the subject information into the mobile communications device allows the second information acceptor 92 to acquire the subject information from the mobile communications device via communication. The second information acceptor 92 may include a user interface for entering the subject information in accordance with the user's operating command.

The information generator 93 generates property information based on the input information. The property information is information about either the subject 100 or the environment which may affect the result of the arithmetic processing performed by the second arithmetic processor 302. The information generator 93 either uses as it is, or appropriately modifies, the environmental information input to the first information acceptor 91 and the subject information input to the second information acceptor 92, thereby generating the property information. The types of the property information generated by the information generator 93 are defined in advance.

The property setter 90 outputs a property signal S300, representing the property information generated by the information generator 93, to the arithmetic processor 30.

As shown in FIG. 4, the arithmetic processor 30 includes a changer 303. The changer 303 includes a first changer 331 and a second changer 332.

The first changer 331 changes, in accordance with the property information, association of the condition levels in the M stages with the condition quantity. Specifically, the first changer 331 changes, in accordance with the property information, at least one threshold value out of (M−1) threshold values.

Figure 6A:
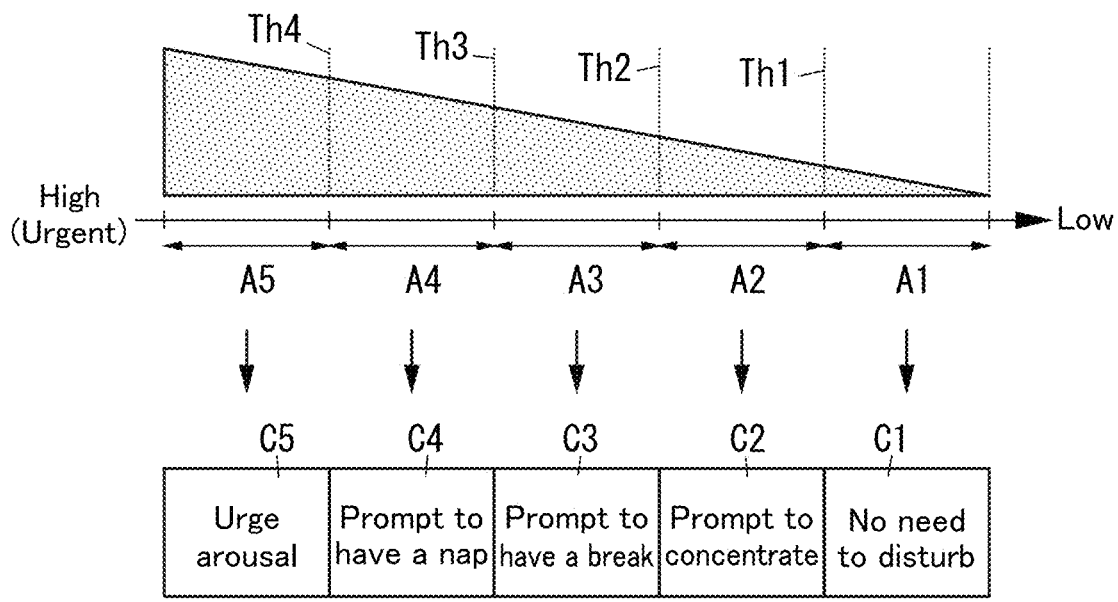
FIGS. 6A and 6B illustrate how a first changer of the monitoring system operates.
Figure 6B:
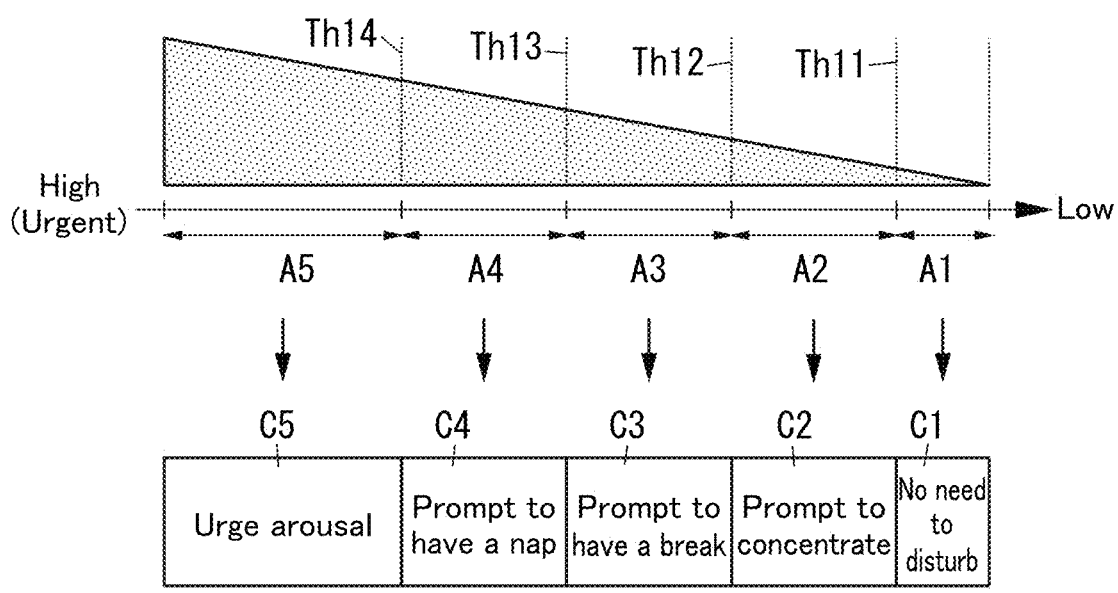

FIGS. 6A and 6B illustrate how the first changer 331 may change the association of the condition levels with the condition quantity. FIG. 6A shows an association between the condition quantity and the condition levels before their association is changed by the first changer 331. FIG. 6B shows an association between the condition quantity and the condition levels after their association is changed by the first changer 331.

In this example, the first threshold value Th1 is changed by the first changer 331 into a first threshold value Th11 which is smaller than the original value thereof. In addition, the second to fourth threshold values Th2-Th4 are also respectively changed into second to fourth threshold values Th12-Th14 which are smaller than the original values thereof. Note that in the example shown in FIGS. 6A and 6B, the association between the condition levels in the M stages (namely, the first level A1 through the fifth level A5) and the contents of notification in the N stages (namely, the first content of notification C1 through the fifth content of notification C5) is unchanged.

The second changer 332 changes, in accordance with the property information, the association of the contents of notification in the N stages with the condition levels in the M stages.

Figure 7A:
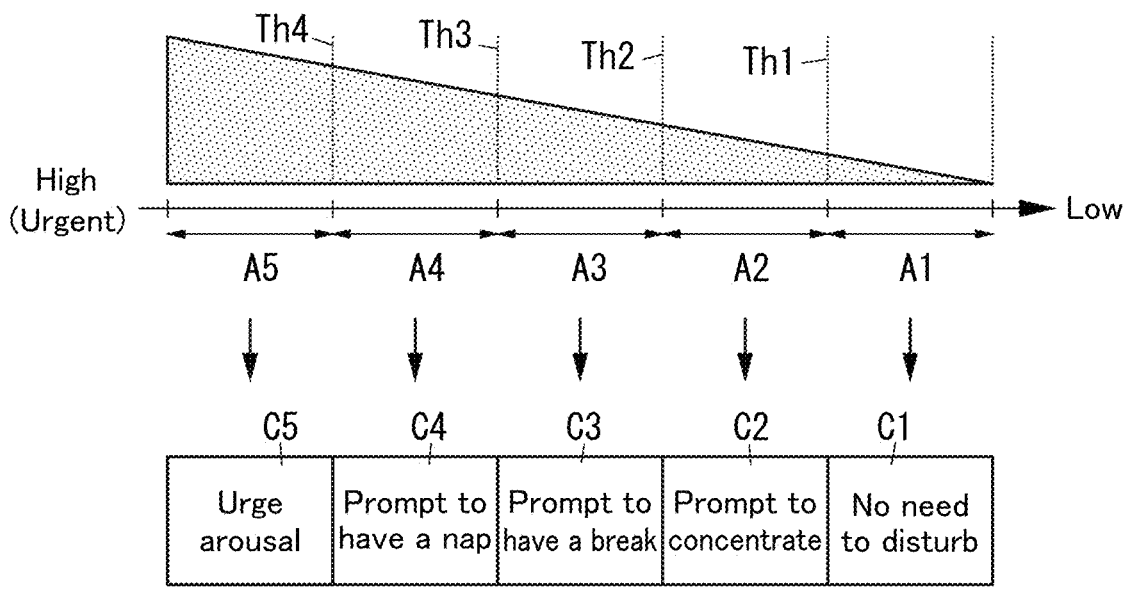
FIGS. 7A and 7B illustrate how a second changer of the monitoring system operates.
Figure 7B:
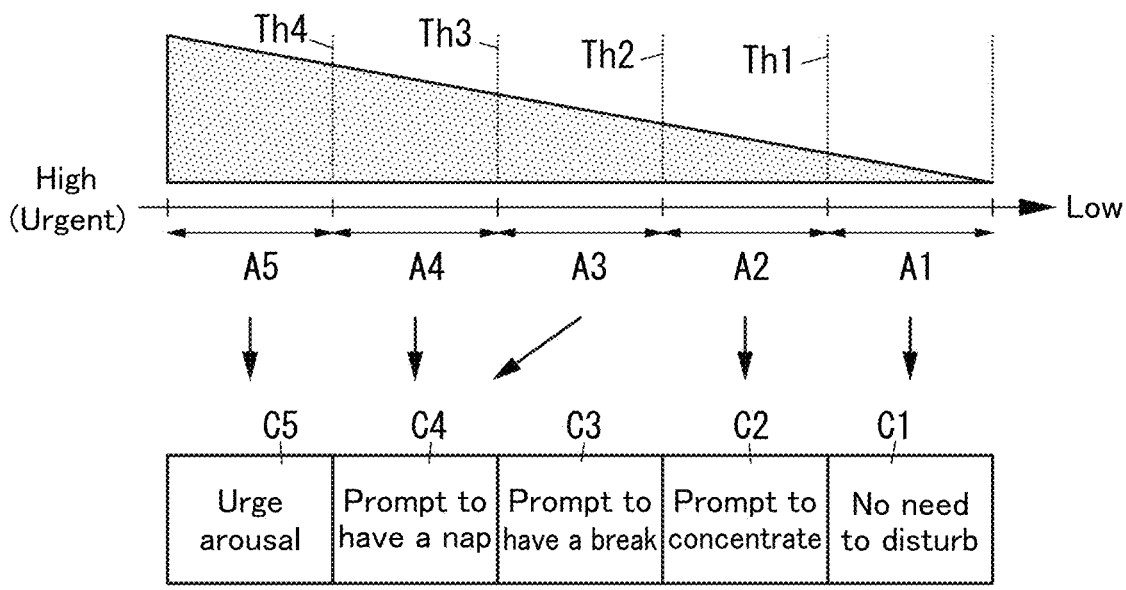

FIGS. 7A and 7B illustrate how the second changer 332 may change the association of the contents of notification with the condition levels. FIG. 7A shows an association between the condition levels and the contents of notification before their association is changed by the second changer 332. FIG. 7B shows an association between the condition levels and the contents of notification after their association is changed by the second changer 332.

In this example, the content of notification associated with the third level A3 is changed by the second changer 332 from the third content of notification C3 into the fourth content of notification C4. Note that in the example shown in FIGS. 7A and 7B, the threshold values (namely, the first threshold value Th1 through the fourth threshold value Th4) are unchanged.

In short, the arithmetic processor 30 includes a changer 303 which changes, in accordance with the property information, the association of the contents of notification in the N stages with the condition quantity. The changer 303 may make the first changer 331 change the threshold value and/or make the second changer 332 change the association of the condition levels with the contents of notification, in accordance with the property information.

As can be seen from the foregoing description, in the monitoring system 1 according to this embodiment, the association of the contents of notification in the N stages with the condition quantity is changed in accordance with the property information generated by reference to information about the environment in which the subject 100 is present and/or information about the subject 100. Thus, even if the condition quantities obtained by the first arithmetic processor 301 with respect to multiple different subjects 100 have the same value, for example, different contents of notification may be selected in accordance with the property information (such as information based on the age of the subject 100, for example). Therefore, the monitoring system 1 according to this embodiment, including the property setter 90 and the changer 303, may make an appropriate notification according to the subject 100.

(1-2) Exemplary Applications

Next, exemplary applications of the monitoring system 1 according to this embodiment will be described.

(1-2-1) First Exemplary Application

A first exemplary application will be described with reference to FIG. 3.

In this exemplary application, the monitoring system 1 is applied to a vehicle. The vehicle may be selected from a group including two-wheeled vehicles, automobiles, railway trains, aircrafts, and watercrafts. In particular, the vehicle may be an automobile. Also, in this exemplary application, the subject 100 is a driver who is driving the vehicle.

In this exemplary application, the image capturing unit 20 is disposed in front of the driver's seat of the vehicle to capture an image of the driver from the front of the driver, for example.

In this exemplary application, the detection parameter includes a parameter about the condition of at least one of the driver's face, the driver's gaze, or the driver's eyelids. The detection parameter may include the pattern (frequency of occurrence) of the driver's blinking. Also, the condition quantity is a quantity about the driver's drowsiness (i.e., a numerical value indicating the degree of his or her drowsiness).

The arithmetic processor 30 (first arithmetic processor 301) calculates, by reference to detection information based on one or more detection parameters selected from the group consisting of the driver's face, the driver's gaze, and the driver's eyelids, condition information (condition quantity) based on the condition parameter. In this example, the condition parameter is the degree of the driver's drowsiness, and the condition quantity is a numerical value indicating the degree of the driver's drowsiness.

Specifically, the first arithmetic processor 301 obtains, based on mainly the pattern (frequency of occurrence) of the driver's blinking as a detection parameter, a numerical value indicating the degree of the driver's drowsiness. The association between the pattern of blinking and the degree of drowsiness may be stored, for example, in the memory of the arithmetic processor 30. The first arithmetic processor 301 calculates, by reference to this association, a numerical value indicating the degree of the driver's drowsiness. The larger the degree of the drowsiness is, the larger the value of the condition quantity becomes.

In addition, the first arithmetic processor 301 calculates the numerical value indicating the degree of the driver's drowsiness by using the driver's face orientation and the driver's gaze direction as auxiliary detection parameters. Alternatively or additionally, the first arithmetic processor 301 may also use the frequency at which the driver changes his or her face orientation or the frequency at which the driver changes his or her gaze direction.

The specifier 321 specifies the particular condition level by comparing the numerical value indicating the degree of the driver's drowsiness as obtained by the first arithmetic processor 301 with (M−1) threshold values. In this example, the specifier 321 specifies, by using four threshold values (namely, a first threshold value Th1 through a fourth threshold value Th4, where Th1<Th2<Th3<Th4), the particular condition level out of the condition levels in five stages (namely, a first level A1 through a fifth level A5). Among the condition levels in five stages, the level associated with the lowest degree of drowsiness is the first level A1 and the level associated with the highest degree of drowsiness is the fifth level A5.

The determiner 322 determines, based on the particular condition level thus specified, the particular notification content. As shown in FIG. 3, the determiner 322 determines a content of notification associated with the particular condition level, out of the contents of notification in five stages associated one to one with the condition levels in five stages (namely, the first level A1 through the fifth level A5), to be the particular notification content.

In this exemplary application, the categories of the contents of notification in five stages include: a category in which no notification is made (no need to disturb); a category in which the driver is prompted to concentrate (prompt to concentrate); a category in which the driver is prompted to have a break (prompt to have a break); a category in which the driver is prompted to have a nap (prompt to have a nap); and a category in which the driver is prompted to be aroused (urge arousal). That is to say, the categories of the contents of notification in the N stages (five stages) include at least one of: a category in which no notification is made; a category in which the driver is prompted to be aroused; a category in which the driver is prompted to concentrate; a category in which the driver is prompted to have a break; or a category in which the driver is prompted to have a nap. In particular, the categories of the contents of notification in the N stages include the category in which the driver is prompted to be aroused.

The arithmetic processor 30 outputs notification information (notification signal S200) representing the particular notification content to the notification unit 80.

The notification unit 80 makes notification of the particular notification content. The notification unit 80 notifies the notifyee of the particular notification content as either audio information or visual information according to the contents of notification in five stages. In particular, if information, associated with the particular notification level (particular notification content) that is a notification level with the highest degree of criticalness (i.e., the fifth content of notification C5) among the plurality of notification levels (corresponding to the first content of notification C1 through the second content of notification C5), is input, the notification unit 80 notifies the notifyee that the notifyee should be prompted to do any action that arouses the driver.

In this exemplary application, the notifyee may be either the same person as the driver who is the subject 100 or a different person from the driver (e.g., a fellow passenger), whichever is appropriate. The notification unit 80 may be either a mobile communications device owned by the driver or a mobile communications device owned by a fellow passenger, whichever is appropriate.

The content of notification corresponding to "prompt to concentrate" (second content of notification C2) may include, for example, displaying information that prompts the driver to concentrate (which may also be light emitted from a monitor) on a monitor 81 of the notification unit 80. In addition, the content of notification corresponding to "prompt to concentrate" may include, for example, emitting a voice or a sound that prompts the driver to concentrate (which may be a beep, for example) from the loudspeaker 82 of the notification unit 80.

The content of notification corresponding to "prompt to have a break" (third content of notification C3) may include, for example, displaying a character string that prompts the driver to have a break on the monitor 81 of the notification unit 80. In addition, the content of notification corresponding to "prompt to have a break" may include, for example, emitting a voice or a sound prompting the driver to have a break from the loudspeaker 82 of the notification unit 80.

The content of notification corresponding to "prompt to have a nap" (fourth content of notification C4) may include, for example, displaying a character string that prompts the driver to have a nap on the monitor 81 of the notification unit 80. In addition, the content of notification corresponding to "prompt to have a nap" may include, for example, emitting a voice or a sound prompting the driver to have a nap from the loudspeaker 82 of the notification unit 80.

The content of notification corresponding to "urge arousal" (fifth content of notification C5) may include, for example, emitting a voice or a sound that arouses the driver from the loudspeaker 82 of the notification unit 80. Optionally, the content of notification corresponding to "urge arousal" may also include, for example, vibrating the mobile communications device serving as the notification unit 80.

As can be seen from the foregoing description, in this exemplary application, the notification unit 80 gives any one of multiple different contents of notification according to the condition of the subject 100 (driver).

The changer 303 changes, in accordance with the property information, the association of the contents of notification in five stages with the condition quantity (indicating the degree of the driver's drowsiness).

In this exemplary application, the environmental information to be input to the first information acceptor 91 (environmental information acceptor) may include, for example, the velocity of the vehicle, the location coordinates of the vehicle, the current time, and the degree of brightness (illuminance) of the surroundings. The velocity, location coordinates, and other pieces of information about the vehicle may be acquired from, for example, an ECU of the vehicle, a traffic light located around the vehicle, or an ECU of a preceding vehicle. The current time may be acquired from, for example, an external device (such as an ECU) or an internal clock. The brightness of the surroundings of the vehicle may be acquired from, for example, an illuminometer mounted to the vehicle.

In this exemplary application, information about the subject 100 (driver) to be input to the second information acceptor 92 (subject information acceptor) may include, for example, the driving experience of the driver, the time when the driver went to bed last night, the time when the driver got up this morning, his or her sleeping hours, his or her degree of fatigue, and his or her heart rate. The driving experience of the driver, the time when the driver went to bed last night, the time when the driver got up this morning, his or her sleeping hours, his or her degree of fatigue, and other pieces of information may be acquired from, for example, the mobile communications device owned by the driver. The driver's heart rate may be acquired from, for example, an activity tracker owned by the driver.

The information generator 93 generates property information based on the information input to the first information acceptor 91 and the information input to the second information acceptor 92, and outputs the property information thus generated to the arithmetic processor 30. The information generator 93 may generate, based on, for example, information about the velocity of the vehicle and information about steering handling, information indicating whether or not the vehicle is traveling along an expressway. The information generator 93 may calculate, for example, the sleeping hours based on input values indicating the time when the driver went to bed last night and the time when he or she got up this morning. The information generator 93 may also calculate the driver's degree of fatigue based on, for example, input values indicating his or her sleeping hours and working hours.

In short, the property information may include information indicating whether or not the vehicle is now traveling along an expressway.

The changer 303 (first changer 331) changes, in accordance with the property information, the threshold values Th1-Th4. In this manner, the changer 303 (first changer 331) changes the association of the contents of notification in five stages with the condition quantity (indicating the degree of the driver's drowsiness). The changer 303 (second changer 332) changes the association of the contents of notification in the five stages with the condition levels in five stages in accordance with the property information.

As can be seen from the foregoing description, in the monitoring system 1 according to this exemplary application, contents of notification are provided in five stages based on a captured image obtained by capturing an image of the subject 100 (driver). This enables notifying the subject 100 appropriately in multiple stages.

For example, the monitoring system 1 according to this embodiment may detect the condition of the subject 100 with reliability and alert him or her before the subject 100 (driver) starts distracted driving.

In addition, in the monitoring system 1 according to this exemplary application, the association of the contents of notification with the condition quantity is changed in accordance with the property information. This enables making notification at an appropriate notification level by reference to various pieces of information about the subject 100 (driver) which are acquired besides information about the environment in which the subject 100 is present and or the captured image.

For example, if the subject 100 (driver) is in such an environment that would induce him or her to start distracted driving, then a precautionary alert may be issued to him or her at a point in time when his or her degree of arousal is still relatively high.

(1-2-2) Second Exemplary Application

Figure 8:
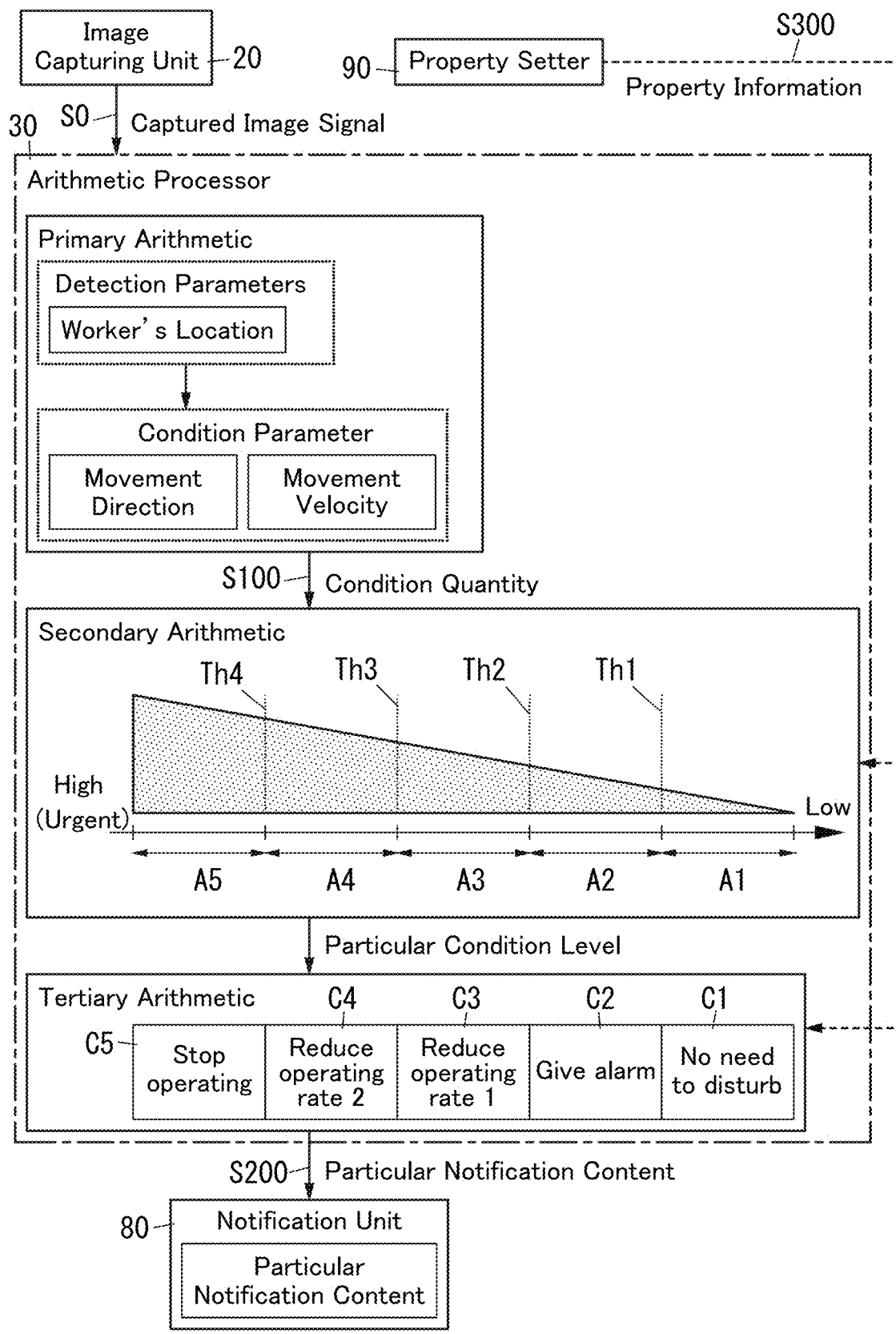
FIG. 8 is a schematic block diagram illustrating a configuration for a main part of a second exemplary application of the monitoring system.

A second exemplary application will be described with reference to FIG. 8.

In this exemplary application, the monitoring system 1 is applied to a workshop such as a factory. Also, in this exemplary application, the subject 100 is a worker who is working in the workshop.

In this exemplary application, the image capturing unit 20 is installed, for example, on the ceiling of the workshop to capture an image of the worker obliquely from above him or her. For example, the image capturing unit 20 may be installed such that a region surrounding an operating machine in the workshop falls within the image capturing range.

In this exemplary application, the detection parameters include a parameter indicating the location of the worker (hereinafter referred to as a "worker's location") in the workshop. The detection parameters may include the location coordinates of the worker in the captured image. Also, the condition quantity is a quantity about the direction and velocity of movement of the worker with respect to an operating machine (more specifically, an operating machine in operation) installed in the workshop.

The arithmetic processor 30 (first arithmetic processor 301) calculates, by reference to detection information based on a detection parameter indicating the worker's location, condition information (condition quantity) based on the condition parameter. In this example, the condition parameter includes the direction and velocity of movement of the worker with respect to the operating machine and the condition quantity is a quantity about the direction and velocity of movement of the worker with respect to the operating machine. The condition quantity may be a numerical value indicating the degree of dangerousness for the worker (i.e., the chances of the worker coming into contact with the operating machine) and obtained based on the direction and velocity of movement of the worker with respect to the operating machine. The higher the velocity of the worker approaching the operating machine is and the closer the worker is located relative to the operating machine, the larger the degree of dangerousness for the worker becomes.

That is to say, the first arithmetic processor 301 calculates, based on the location of the worker shot in the captured image (which may be a moving picture), the direction and velocity of movement of the worker with respect to the operating machine. In addition, the first arithmetic processor 301 also calculates, based on the direction and velocity of movement of the worker and the location of the operating machine, the degree of dangerousness for the worker. The larger the degree of dangerousness is, the larger the value of the condition quantity becomes.

The specifier 321 specifies the particular condition level by comparing the numerical value (indicating the degree of dangerousness) obtained by the first arithmetic processor 301 with (M−1) threshold values. In this example, the specifier 321 specifies, by using four threshold values (namely, a first threshold value Th1 through a fourth threshold value Th4, where Th1<Th2<Th3<Th4), the particular condition level out of the condition levels in five stages (namely, a first level A1 through a fifth level A5). Among the condition levels in five stages, the level associated with the lowest degree of dangerousness is the first level A1 and the level associated with the highest degree of dangerousness is the fifth level A5.

The determiner 322 determines, based on the particular condition level thus specified, the particular notification content. As shown in FIG. 8, the determiner 322 determines a content of notification associated with the particular condition level, out of the contents of notification in five stages (namely, the first content of notification C1 through the fifth content of notification C5) associated one to one with the condition levels in five stages (namely, the first level A1 through the fifth level A5), to be the particular notification content.

In this exemplary application, the categories of the contents of notification in five stages include: a category in which no notification is made (no need to disturb); a category in which the worker is alarmed (give alarm); a category in which an operating rate of the operating machine is reduced (reduce operating rate 1); a category in which the operating rate of the operating machine is further reduced (reduce operating rate 2); and a category in which the operating machine is stopped (stop operating). That is to say, the categories of the contents of notification in N stages (five stages) include at least one of: a category in which no notification is made; a category in which the worker is alarmed; a category in which an operating rate of the operating machine is reduced; or a category in which the operating machine is stopped. In particular, the categories of the contents of notification in the N stages include a category in which the operating machine is stopped.

The arithmetic processor 30 outputs notification information (notification signal S200), representing the particular notification content, to the notification unit 80.

The notification unit 80 makes notification of the particular notification content. The notification unit 80 notifies the notifyee of the particular notification content according to the contents of notification in five stages. In particular, if information, associated with the particular notification level (particular notification content) that is a notification level with the highest degree of dangerousness (i.e., the fifth content of notification C5) among the plurality of notification levels (corresponding to the first content of notification C1 through the second content of notification C5), is input, the notification unit 80 notifies the notifyee that the machine in the workshop (i.e., the machine installed in the vicinity of the worker in the workshop) should be stopped.

In this exemplary application, the notifyee includes at least one of the operating machine or an operation manager who manages the operation of the operating machine. Optionally, the notifyee according to this exemplary application may include the subject 100 (worker). The contents of notification corresponding to the categories of "reduce operating rate 1," "reduce operating rate 2," and "stop operating" (namely, the third content of notification C3, the fourth content of notification C4, and the fifth content of notification C5) are given to either the operating machine or the operation manager. Meanwhile, the content of notification corresponding to the category of "give alarm" (namely, the second content of notification C2) is given to the worker and/or the operation manager.

That is to say, the notification unit 80 according to this exemplary application may include control equipment for controlling the operation of the operating machine.

The content of notification corresponding to "give alarm" (namely, the second content of notification C2) may include, for example, emitting an alarm for the worker through the loudspeaker 82 of the notification unit 80.

The content of notification corresponding to "reduce operating rate 1" (namely, the third content of notification C3) may include, for example, outputting a notification (instruction) that the operating rate of the operating machine should be reduced to a control device for the operating machine. The content of notification corresponding to "reduce operating rate 1" may include, for example, providing the operation manager with information about a request for reducing the operating rate of the operating machine.

The content of notification corresponding to "reduce operating rate 2" (namely, the fourth content of notification C4) may include, for example, outputting a notification (instruction) that the operating rate of the operating machine should be reduced more significantly than in the case of "reduce operating rate 1" to the control device for the operating machine. The content of notification corresponding to "reduce operating rate 2" may include, for example, providing the operation manager with information about a request for reducing the operating rate of the operating machine more significantly than in the case of "reduce operating rate 1."

The content of notification corresponding to "stop operating" (namely, the fifth content of notification C5) may include, for example, outputting a notification (instruction) that the operating machine should be stopped to the control device for the operating machine. The content of notification corresponding to "stop operating" may include, for example, providing the operation manager with information about a request for stopping the operating machine.

As can be seen from the foregoing description, in this exemplary application, the notification unit 80 gives any one of multiple different contents of notification according to the condition of the subject 100 (worker).

The changer 303 changes the association of the contents of notification in the five stages with the condition quantity (indicating the degree of dangerousness for the worker) in accordance with the property information.

In this exemplary application, the environmental information to be input to the first information acceptor 91 (environmental information acceptor) may include, for example, the type of the operating machine, the current time, and the degree of brightness (illuminance) of the environment surrounding the worker. The type of the operating machine may be acquired from, for example, a terminal device (such as a personal computer) installed in the workshop and storing information about the operating machine. The current time may be acquired from, for example, an appropriate external device or an internal clock. The brightness of the environment surrounding the worker may be acquired from, for example, an illuminometer provided in the workshop.

In this exemplary application, information about the subject 100 (worker) to be input to the second information acceptor 92 (subject information acceptor) may include, for example, the work experience of the worker, the working hours (i.e., the amount of time that has passed since he or she reported for work), his or her sleeping hours, and his or her degree of fatigue. The worker's work experience, working hours, sleeping hours, degree of fatigue, and other pieces of information may be acquired from, for example, the terminal device installed in the workshop.

The information generator 93 generates property information based on the information input to the first information acceptor 91 and the information input to the second information acceptor 92, and outputs the property information thus generated to the arithmetic processor 30. The information generator 93 may determine the degree of dangerousness of the operating machine based on the type of the operating machine, for example. The information generator 93 may calculate the worker's sleeping hours based on, for example, input values indicating the time when he or she went to bed last night and the time when he or she got up this morning. The information generator 93 may also calculate the worker's degree of fatigue based on, for example, input values indicating his or her sleeping hours and working hours.

In short, the property information may include information about the dangerousness of the operating machine installed in the workshop.

The changer 303 (first changer 331) changes, in accordance with the property information, the threshold values Th1-Th4. In this manner, the changer 303 (first changer 331) changes the association of the contents of notification in five stages with the condition quantity (indicating the degree of dangerousness for the worker). The changer 303 (second changer 332) changes the association of the contents of notification in the five stages with the condition levels in five stages in accordance with the property information.

As can be seen from the foregoing description, in the monitoring system 1 according to this exemplary application, contents of notification are provided in five stages based on a captured image obtained by capturing an image of the subject 100 (worker). This enables notifying the subject 100 appropriately in multiple stages.

For example, the monitoring system 1 according to this embodiment may detect the condition of the subject 100 (worker) with reliability and alarm him or her before the subject 100 (worker) approaches the operating machine and enters the danger zone.

In addition, in the monitoring system 1 according to this exemplary application, the association of the contents of notification with the condition quantity is changed in accordance with the property information. This enables making notification at an appropriate notification level by reference to various pieces of information about the subject 100 (worker) which are acquired besides information about the environment in which the subject 100 is present or the captured image.

For example, if the subject 100 (worker) is approaching an operating machine with a high degree of dangerousness for him or her, then a precautionary alarm may be issued to him or her at a point in time when the degree of dangerousness is still relatively low for the worker.

(1-3) Captured Image Information

Next, it will be described how the image capture device (including the light source unit 10, the image capturing unit 20, and the controller 40) generates a captured image (i.e., a luminance image and a distance image).

To capture a luminance image, the controller 40 makes the light source unit 10 emit light (near-infrared light) and then makes the image capturing unit 20 be exposed for a predetermined exposure period, thereby making the image capturing unit 20 capture a first image. Meanwhile, the controller 40 has the image capturing unit 20 exposed for the predetermined exposure period without making the light source unit 10 emit light (irradiating light L1), thereby making the image capturing unit 20 capture a second image. The image capturing unit 20 generates the luminance image by subtracting a signal component of the second image from a signal component of the first image.

That is to say, the captured image information is information obtained by subtracting a signal component of a second captured image (the second image) from a signal component of a first captured image (the first image). The first captured image is obtained by imaging, by the capturing unit 20, reflected light L2 that is light (irradiating light L1) emitted from the light source unit 10 and reflected by a region covering the subject 100. The second captured image is obtained based on light (background light L3) coming from the region covering the subject 100 in a state where no light (irradiating light L1) is emitted from the light source unit 10.

The image capturing unit 20 outputs a signal including the captured image information that represents the luminance image (i.e., a second captured image signal S20) to the arithmetic processor 30. The captured image signal S0 includes the second captured image signal S20 representing the luminance information.

In capturing a distance image, the image capture device captures the distance image by the time-of-flight (TOF) method. Specifically, the controller 40 makes the light source unit 10 emit either frequency-modulated pulse light or continuous light (irradiating light L1) and also makes the image capturing unit 20 image the light reflected from the subject 100 (reflected light L2). The image capturing unit 20 generates the distance image based the difference (phase difference) between the phase of the irradiating light L1 and the phase of the reflected light L2.

More specifically, the controller 40 makes the light source unit 10 emit either frequency-modulated pulse light or continuous light (irradiating light L1) and also has the image capturing unit 20 exposed, thereby making the image capturing unit 20 capture a third image. In addition, the controller 40 also has the image capturing unit 20 exposed with no light emitted from the light source unit 10, thereby making the image capturing unit 20 capture a fourth image. Furthermore, the image capturing unit 20 obtains a signal component at each pixel (representing the intensity of the light received there) by subtracting a signal component at each pixel in the fourth image (representing the intensity of the light received there) from a signal component at a corresponding pixel in the third image (representing the intensity of the light received there) and obtains the phase of the reflected light L2 based on the signal component thus obtained. That is to say, the captured image information includes information obtained by subtracting the signal component of the second captured image (fourth image) from the signal component of the first captured image (third image). The first captured image is obtained by imaging, by the capturing unit 20, light (the reflected light L2) that is a light (irradiating light L1) emitted from the light source unit 10 and reflected by a region covering the subject 10. On the other hand, the second captured image is obtained based on the light coming from the region covering the subject 100 (i.e., background light L3) while no light is emitted from the light source unit 10.

In other words, the monitoring system 1 includes the light source unit 10. The captured image signal S0 is a signal obtained by subtracting the signal generated by the light (background light L3) in a state where no light is emitted from the light source unit 10, from the signal generated by the reflected light L2 produced from the light (irradiating light L1) for obtaining distance information reflected from the subject 100 emitted from the light source unit 10.

The image capturing unit 20 outputs a signal including captured image information representing the distance image (first captured image signal S10) to the arithmetic processor 30. The captured image signal S0 includes the first captured image signal S10 representing the distance information.

As can be seen from the foregoing description, the captured image signal S0 includes both the first captured image signal S10 to obtain the distance information and the second captured image signal S20 to obtain the luminance information.

Figure 9:
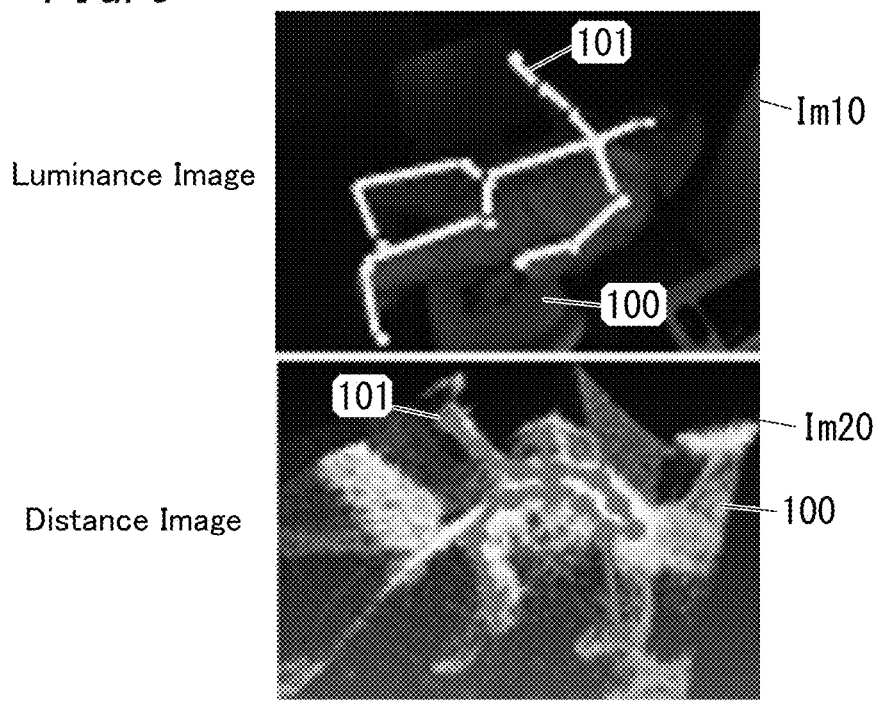
FIG. 9 illustrates how an image capturing unit of the monitoring system captures images.
Figure 10:
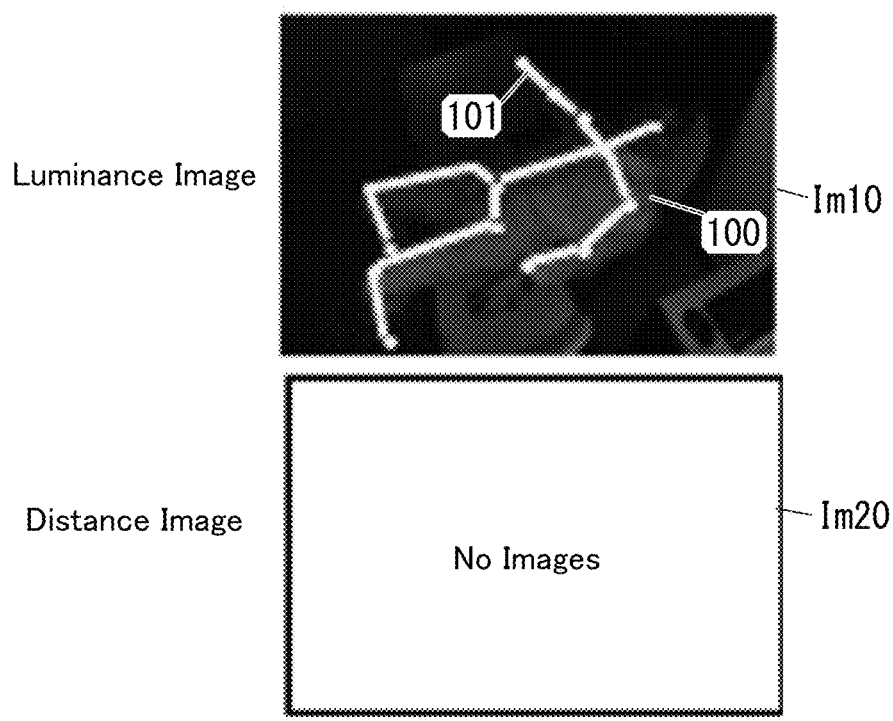
FIG. 10 illustrates how an image capturing unit of a monitoring system according to a first comparative example captures images.

FIG. 9 shows exemplary captured images obtained by the image capturing unit 20 of the monitoring system 1 according to this embodiment. FIG. 10 shows exemplary captured images obtained by an image capturing unit of a monitoring system according to a first comparative example. The monitoring system according to the first comparative example uses only a luminance image Im10 (luminance information) as the captured image. In the example shown in FIGS. 9 and 10, the subject 100 is a cared person. In this example, the subject 100 (cared person) has raised his or her arm 101, which is in contact with a pole of a bed. Note that in FIGS. 9 and 10, a posture of the subject 100 is schematically illustrated as a stick picture in the captured image just for the purpose of making the posture easily understandable.

In the monitoring system 1 according to this embodiment, the captured image signal S0 includes the first captured image signal S10 and the second captured image signal S20 as described above. Thus, unlike the monitoring system according to the first comparative example that uses only the luminance image Im10 (luminance information) as shown in FIG. 10, the monitoring system 1 according to this embodiment may determine the condition of the subject 100 by using both the distance image Im20 (distance information) and the luminance image Im10 (luminance information). This allows the monitoring system 1 according to this embodiment to accurately monitor the condition (or action) of the subject 100 which is difficult to recognize based on only the luminance image Im10 due to, for example, overlap of the body part of the cared person (subject 100) with the bed.

Note that in the monitoring system 1 according to this embodiment, the distance image Im20 and the luminance image Im10 described above are each a captured image signal output from a solid-state image sensor having the pixel array shown in FIG. 2A. Thus, both the luminance image Im10 and the distance image Im20 are based on the near-infrared light (infrared ray, IR) received. However, this is only an example of the monitoring system 1 according to this embodiment and should not be construed as limiting.

For example, in the case of the captured image signal S0 output from a solid-state image sensor having the pixel array shown in FIG. 2B or 2C, either the distance image Im20 or the distance image Im20 and the luminance image Im10 including a near-infrared light region (IR luminance image) may be formed based on the first pixels 31, while the luminance image Im10 (light and dark tone luminance image) including a visible light region may be formed based on the second pixels 32.

Meanwhile, in the case of the captured image signal S0 output from a solid-state image sensor having the pixel array shown in FIG. 2D, either the distance image Im20 or the distance image Im20 and the luminance image Im10 including a near-infrared light region (IR luminance image) may be formed based on the first pixels 31, while the luminance image Im10 (color luminance image) including a visible light region may be formed based on the third pixels 33, the fourth pixels 34, and the fifth pixels 35.

Furthermore, the monitoring system 1 according to this embodiment includes the light source unit 10 (see FIG. 1) and the captured image signal S0 includes the first captured image signal S10 representing the distance information and the second captured image signal S20 representing the luminance information as described above. In addition, at least one (e.g., both in this embodiment) of the first captured image signal S10 or the second captured image signal S20 is a signal obtained by subtracting the signal component of the second captured image produced by the light (background light L3) coming from the region covering the subject 100 in a state where no light (irradiating light L1) is emitted from the light source unit 10 from the signal component of the first captured image obtained by imaging, by the image capturing unit 20, light (reflected light L2) that is light (irradiating light L1) emitted from the light source unit 10 and reflected by a region covering the subject 100.

Figure 11:
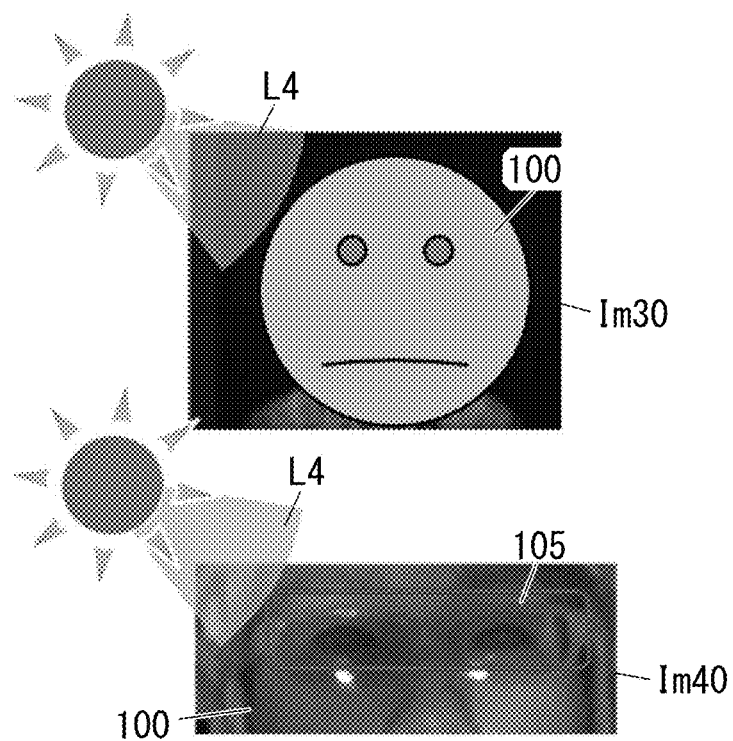
FIG. 11 illustrates how an image capturing unit of a monitoring system according to an exemplary embodiment captures images.

FIG. 11 schematically illustrates a captured image Im30 of the subject 100 generated by the image capturing unit 20 according to this embodiment and also illustrates an exemplary luminance image Im40 based on the second captured image signal S20 supplied from the image capturing unit 20.

Figure 12:
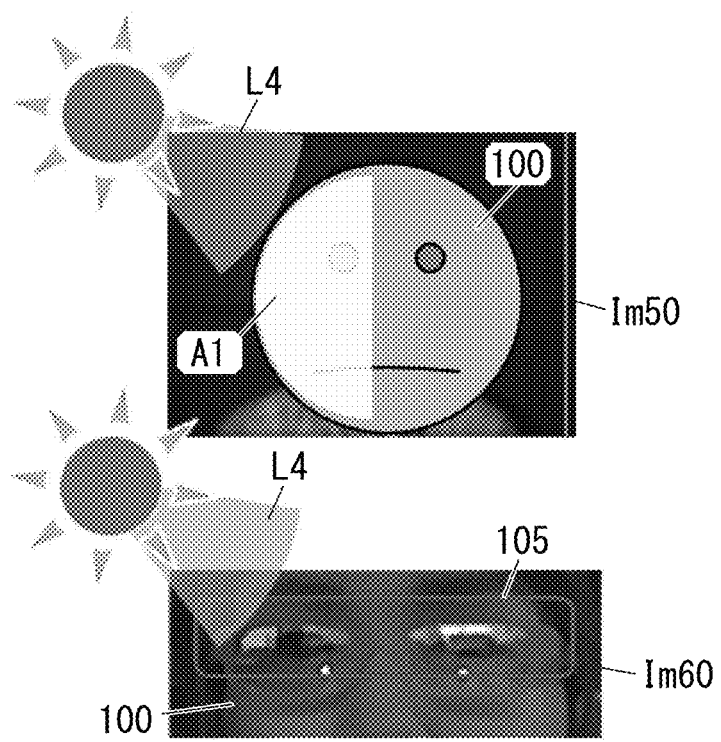
FIG. 12 illustrates how an image capturing unit of a monitoring system according to a second comparative example captures images.

On the other hand, FIG. 12 schematically illustrates a captured image Im50 of the subject 100 generated by the image capturing unit of a monitoring system according to a second comparative example and also illustrates an exemplary luminance image Im60 based on the second captured image signal S20 supplied from the image capturing unit. The image capturing unit of the monitoring system according to the second comparative example generates the luminance image Im60 by using the signal component of the first captured image (first image) as it is without subtracting a signal component corresponding to the second image therefrom.

When intense external light such as the sun light L4 impinges on the subject 100, the image of the subject 100 captured by the image capturing unit according to the second comparative example tends to be affected by the external light as shown in the upper portion of FIG. 12 (see the white region A1 on the right half of the subject 100).

On the other hand, in the image capturing unit 20 of the monitoring system 1 according to this embodiment, the luminance image Im40 includes information obtained by subtracting the signal component of the second image from the signal component of the first image. In this case, the external light such as the sun light L4 is included in not only the signal component of the second image but also the signal component of the first image as well. This allows the image capturing unit 20 of the monitoring system 1 according to this embodiment to reduce the effect of the external light on the luminance image Im40 by subtracting the signal component of the second image from the signal component of the first image.

That is to say, the monitoring system 1 according to this embodiment may monitor the subject 100 more accurately and with a higher degree of robustness even in a distance measuring environment under a bad condition (e.g., under intense external light) than the monitoring system according to the second comparative example.

Thus, even if the subject 100 is located either outdoors or indoors with intense external light such as the sun light L4 incident thereon (i.e., located semi-outdoors) as shown in FIG. 11, for example, the subject 100 (e.g., a driver) or a person beside him or her may be given a notification prompting him or her to take an action to avoid a critical condition before the subject 100 falls into the critical condition.

In addition, as shown in the lower portion of FIG. 11 and the lower portion of FIG. 12, the monitoring system 1 according to this embodiment may also monitor the condition of the subject 100 (e.g., the gaze of the subject 100) more accurately than the monitoring system according to the second comparative example even if the subject 100 wears some additional gear (e.g., a pair of glasses 105 in FIGS. 11 and 12). That is to say, the monitoring system 1 according to this embodiment may perform monitoring with a high degree of robustness even when the distance measuring condition or environment changes.

As described above with reference to the accompanying drawings, the monitoring system 1 according to this embodiment may determine the condition of the subject 100, which falls within the range from a normal condition through a critical condition, according to notification levels (degrees of criticalness) in multiple stages while monitoring (watching) the subject 100 under any of various environments and factors. In addition, associating the degrees of criticalness (condition levels in M stages) with the actions of the watcher (notifyee) (contents of notification in N stages) enables the watch service provider to respond more quickly and also contributes to standardizing their actions to take (i.e., compiling a manual) in emergency situations.

(1-4) Monitoring Method

Figure 13:
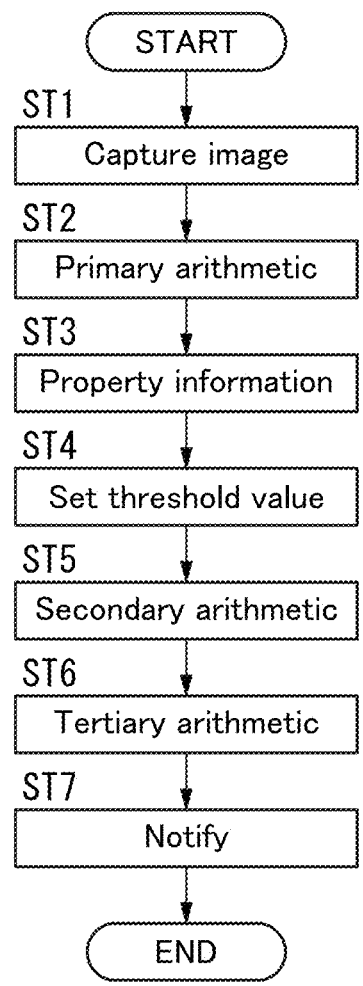
FIG. 13 is a flowchart illustrating a monitoring method according to an exemplary embodiment.

Next, a monitoring method according to the present disclosure will be described briefly with reference to FIG. 13.

The image capturing unit 20 generates a captured image by capturing an image of the subject 100 (in ST1) and provides captured image information (captured image signal S0) representing the captured image to the arithmetic processor 30. The captured image signal S0 includes the first captured image signal S10 and the second captured image signal S20.

The arithmetic processor 30 (first arithmetic processor 301) obtains a condition quantity by quantifying a condition of the subject 100 (primary arithmetic; in ST2) by reference to the captured image information and based on a parameter about a human activity status (detection parameter).

Also, the property setter 90 receives, as input information, information about an environment in which the subject 100 is present and information about the subject 100 and generates property information based on the input information (in ST3). The arithmetic processor 30 (changer 303) sets a threshold value and defines an association between the condition levels and the contents of notification in accordance with the property information (in ST4).

The arithmetic processor 30 (second arithmetic processor 302) selects, according to the condition quantity, a particular notification content from contents of notification classified into N stages, where N is an integer equal to or greater than three. More specifically, the arithmetic processor 30 (the specifier 321) specifies, based on a result of comparison between the condition quantity and a threshold value, a particular condition level from condition levels sorted into M stages, where M is an integer equal to or greater than N (secondary arithmetic; ST5). Furthermore, the arithmetic processor 30 (the determiner 322) determines, based on the particular condition level, a content of notification associated with the particular condition level out of the contents of notification in the N stages, to be the particular notification content (tertiary arithmetic; ST6). Then, the arithmetic processor 30 outputs notification information representing the particular notification content (notification signal S200) to the notification unit 80.

The notification unit 80 notifies, in accordance with the notification information, the notifyee of the particular notification content (in ST7).

(2) Variations

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure. The functions of the arithmetic processor 30 according to the exemplary embodiment described above may also be implemented as, for example, an arithmetic processing method, a (computer) program, or a non-transitory storage medium on which the program is stored.

An arithmetic processing method according to an aspect is performed by one or more processors which receive captured image information representing a captured image obtained by capturing an image of a subject 100. The arithmetic processing method includes first arithmetic processing and second arithmetic processing. The first arithmetic processing includes obtaining a condition quantity by quantifying the condition of the subject 100 by reference to the captured image information and based on a parameter about a human activity status. The second arithmetic processing includes selecting, according to the condition quantity, a particular notification content from contents of notification classified into N stages, where N is an integer equal to or greater than three.

A program according to another aspect is designed to cause at least one processor, which receives captured image information representing a captured image obtained by capturing an image of a subject 100, to perform first arithmetic processing and second arithmetic processing. The first arithmetic processing includes obtaining a condition quantity by quantifying the condition of the subject 100 by reference to the captured image information and based on a parameter about a human activity status. The second arithmetic processing includes selecting, according to the condition quantity, a particular notification content from contents of notification classified into N stages, where N is an integer equal to or greater than three.

A non-transitory storage medium according to still another aspect stores the program described above.

Next, variations of the exemplary embodiment described above will be enumerated one after another. Note that the variations to be described below may be adopted in combination as appropriate.

In the monitoring system 1 according to the present disclosure, the arithmetic processor 30 thereof, for example, includes a computer system. The computer system includes, as principal hardware components, a processor and a memory. The functions of the arithmetic processor 30 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Also, the plurality of functions of the monitoring system 1 may be integrated together in a single housing. Conversely, as in the exemplary embodiment described above, those constituent elements of the monitoring system 1 may be distributed in multiple different housings. Still alternatively, as in the exemplary embodiment described above, at least some functions of the arithmetic processor 30, for example, of the monitoring system 1 may be implemented as either a server or a cloud computing system as well.

In one variation, the image capture device may capture a distance image by direct TOF method. In that case, the image capture device may make the light source unit 10 emit pulse light and may generate a distance image based on the time lag between a time when the pulse light is emitted from the light source unit 10 and a time when reflected light, produced by having the pulse light reflected, reaches the image capturing unit 20.

In one variation, the method of capturing a distance image by using the monitoring system 1 does not have to be the TOF method but may also be any other method (such as triangulation method or structured light method). Furthermore, the distance information does not have to be obtained by the method in which the irradiating light L1 is emitted and the light reflected from the subject 100 is received (i.e., a so-called "active method") but may also be a method in which no irradiating light L1 is emitted (i.e., a so-called "passive method") as in the stereo camera method.

In one variation, the first arithmetic processor 301 may also be implemented as a learned model. The learned model is designed to output a condition quantity (condition quantity signal S100) in response to given input (captured image information: captured image signal S0). The learned model is generated by machine learning algorithm using at least a certain quantity of learning data. As a method for generating the learned model, either unsupervised learning or supervised learning may be used as appropriate. As the unsupervised learning, a typical dimension compression technique such as principal component analysis, self-organization map, or auto-encoder may be used. As the supervised learning, a typical multilayer neural network having a supervised learning mechanism may be used.

In one variation, the first arithmetic processor 301 and the second arithmetic processor 302 may be implemented as a learned model. The learned model outputs a particular notification content (notification signal S200) in response to a given input (captured image information: captured image signal S0).

In one variation, the notification unit 80 does not have to be a general-purpose mobile communications device but may also be a terminal dedicated to the monitoring system 1. Optionally, the notification unit 80 may also be built in another device such as a car navigation system for the vehicle, for example.

In one variation, the monitoring system 1 has only to include the arithmetic processor 30 and does not have to include the light source unit 10, the image capturing unit 20, the controller 40, the notification unit 80, the property setter 90, and other components.

While the foregoing has described what are considered to be the best mode and/or other examples, it is understood that various modifications may be made therein and that the subject matter disclosed herein may be implemented in various forms and examples, and that they may be applied in numerous applications, only some of which are described herein. It is intended by the following claims to claim any and all modifications and variations that fall within the true scope of the present teachings.

The invention claimed is:

1. A monitoring system comprising an arithmetic processor configured to receive captured image information, representing a captured image obtained by capturing an image of a subject, and to generate notification information representing a particular notification content depending on a condition of the subject,
the arithmetic processor including:
  a first arithmetic processor configured to obtain a condition quantity by quantifying the condition of the subject by reference to the captured image information and based on a parameter about a human activity status; and
  a second arithmetic processor configured to select, according to the condition quantity, the particular notification content from contents of notification classified into N stages, where the contents of notification are preliminarily classified into N stages and stored in one or more memories, and N is an integer equal to or greater than three.

2. The monitoring system of claim 1, wherein the second arithmetic processor includes:
  a specifier configured to specify, based on a result of comparison between the condition quantity and a threshold value, a particular condition level from condition levels sorted into M stages, where M is an integer equal to or greater than N; and
  a determiner configured to determine, based on the particular condition level, a content of notification associated with the particular condition level out of the contents of notification in the N stages, to be the particular notification content.

3. The monitoring system of claim 1, further comprising a property setter configured to receive, as input information, at least one of information about an environment in which the subject is present or information about the subject and output property information, which is based on the input information, to the arithmetic processor, wherein
  the arithmetic processor further includes a changer configured to change, in accordance with the property information, association of the contents of notification in the N stages with the condition quantity.

4. The monitoring system of claim 2, further comprising a property setter configured to receive, as input information, at least one of information about an environment in which the subject is present or information about the subject and output property information, which is based on the input information, to the arithmetic processor, wherein
  the arithmetic processor further includes at least one of:
  a first changer configured to change, in accordance with the property information, association of the condition levels in the M stages with the condition quantity; or
  a second changer configured to change, in accordance with the property information, association of the contents of notification in the N stages with the condition levels in the M stages.

5. The monitoring system of claim 1, wherein
the subject is a driver who is driving a vehicle,
the parameter includes a parameter about a condition of at least one of the driver's face, the driver's gaze, or the driver's eyelids, and
the condition quantity is a quantity about the driver's drowsiness.

6. The monitoring system of claim 5, wherein
categories of the contents of notification in the N stages include at least one of: a category in which no notification is made; a category in which the driver is prompted to be aroused; a category in which the driver is prompted to concentrate; a category in which the driver is prompted to have a break; or a category in which the driver is prompted to have a nap.

7. The monitoring system of claim 5, wherein
categories of the contents of notification in the N stages include a category in which the driver is prompted to be aroused.

8. The monitoring system of claim 3, wherein
the subject is a driver who is driving a vehicle, and
the property information includes information indicating whether or not the vehicle is traveling along an expressway.

9. The monitoring system of claim 1, wherein
the subject is a worker who is working in a workshop,
the parameter includes a parameter indicating the worker's location in the workshop, and
the condition quantity is a quantity about a direction and velocity of the worker's movement with respect to an operating machine installed in the workshop.

10. The monitoring system of claim 9, wherein
categories of the contents of notification in the N stages include at least one of: a category in which no notification is made; a category in which the worker is alarmed; a category in which an operating rate of the operating machine is reduced; or a category in which the operating machine is stopped.

11. The monitoring system of claim 9, wherein
categories of the contents of notification in the N stages include a category in which the operating machine is stopped.

12. The monitoring system of claim 3, wherein
the subject is a worker who is working in a workshop, and
the property information includes information about dangerousness of an operating machine installed in the workshop.

13. The monitoring system of claim 1, wherein
the condition quantity is a quantity about a degree of criticalness of the condition of the subject, and
categories of the contents of notification in the N stages correspond to multiple levels defined by making a stepwise classification of the conditions of the subject ranging from a normal condition through a critical condition.

14. The monitoring system of claim 1, further comprising a notification unit configured to notify, in accordance with the notification information representing the particular notification content, a notifyee of the particular notification content.

15. The monitoring system of claim 14, wherein
the notification unit includes at least one of a monitor configured to notify the notifyee of visual information or a loudspeaker configured to notify the notifyee of audio information.

16. The monitoring system of claim 1, wherein
the captured image information includes information indicating at least one of a luminance image representing a luminance distribution on the subject or a distance image representing a distribution of a distance to the subject.

17. The monitoring system of claim 1, further comprising a light source unit configured to irradiate the subject with light, wherein
the captured image information is information obtained by subtracting a signal component of a second captured image from a signal component of a first captured image,
the first captured image is obtained by imaging, by a capturing unit, reflected light that is emitted from the light source unit and reflected by a region covering the subject, and
the second captured image is obtained based on light coming from the region covering the subject in a state where no light is emitted from the light source unit.

18. The monitoring system of claim 1, further comprising an image capturing unit configured to generate the captured image by capturing an image of the subject.

19. The monitoring system of claim 18, wherein
the image capturing unit is configured to capture a distance image by time-of-flight method.

20. A non-transitory storage medium storing thereon a program designed to cause one or more processors, which are configured to receive captured image information representing a captured image obtained by capturing an image of a subject, to perform:

first arithmetic processing including obtaining a condition quantity by quantifying a condition of the subject by reference to the captured image information and based on a parameter about a human activity status; and second arithmetic processing including selecting, according to the condition quantity, a particular notification content from contents of notification classified into N stages, where the contents of notification are preliminarily classified into N stages and stored in one or more memories, and N is an integer equal to or greater than three.

* * * * *